US010062005B2

(12) United States Patent
Eliazar

(10) Patent No.: US 10,062,005 B2
(45) Date of Patent: Aug. 28, 2018

(54) MULTI-SCALE CORRESPONDENCE POINT MATCHING USING CONSTELLATION OF IMAGE CHIPS

(71) Applicant: Teledyne Scientific & Imaging, LLC, Thousand Oaks, CA (US)

(72) Inventor: Austin I. Eliazar, Durham, NC (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 478 days.

(21) Appl. No.: 14/660,254

(22) Filed: Mar. 17, 2015

(65) Prior Publication Data

US 2016/0275367 A1 Sep. 22, 2016

(51) Int. Cl.
*G06K 9/62* (2006.01)
*G06T 7/33* (2017.01)

(52) U.S. Cl.
CPC ............. *G06K 9/6211* (2013.01); *G06T 7/33* (2017.01); *G06T 2207/10012* (2013.01); *G06T 2207/10016* (2013.01); *G06T 2207/20016* (2013.01); *G06T 2207/20076* (2013.01)

(58) Field of Classification Search
CPC ......... G06K 9/6211; G06T 7/55; G06T 7/593; G06T 2207/20076; G06T 2207/20016; G06T 2207/10016; G06T 2207/10012; G06T 7/33
USPC ....................................................... 382/154
See application file for complete search history.

(56) References Cited

PUBLICATIONS

Kim, Jaechul, et al. "Deformable spatial pyramid matching for fast dense correspondences." Proceedings of the IEEE Conference on Computer Vision and Pattern Recognition. 2013.*
Sobel, Joel. "Linear Programming Notes V Problem Transformations." Economics 172. Aug. 20, 2013. Web. Jul. 13, 2017.*
Forstner, "A Feature Based Correspondence Algorithm for Image Matching," Int. Arch. of Photogrammetry, 1986, p. 1-17.
Lucas et al., "An Iterative Image Registration Technique with an Application to Stereo Vision," Proceedings of Imaging Understanding Workshop, 1981, pp. 121-130.
Tang et al., "Robust Multiscale Stereo Matching from Fundus Images with Radiometric Differences," IEEE Transactions on Pattern Analysis and Machine Intelligence, vol. 33, No. 11, Nov. 2011, pp. 2245-2258.
Bergen et al.,"Hierarchical Model-Based Motion Estimation," Computer Vision—ECCV'92, 1992.

(Continued)

*Primary Examiner* — Chan Park
*Assistant Examiner* — Geoffrey E Summers
(74) *Attorney, Agent, or Firm* — Eric A. Gifford

(57) ABSTRACT

A method of matching images A and B of the same scene taken at different locations in the scene is provided by matching correspondence points in the image by evaluating pixel characteristics from nearby regions using a constellation of image chips and utilizing joint information across multiple resolution levels in a probability framework. Since each image chip is small, each chip in one image potentially can be matched with a number of chips in the other image. The accumulation of evidence (probability) over all image chips within the constellation over multiple resolution levels reduces the ambiguity. The use of a constellation of image chips removes the requirement present in most visual point matching techniques to special feature points (e.g. corner points) as the correspondence points.

14 Claims, 9 Drawing Sheets

(56) References Cited

PUBLICATIONS

Chris Harris, "Geometry from visual motion," in Active Vision, Cambridge, MA USA, MIT Press, 1993, pp. 263-284.

Kim et al., "Deformable spatial pyramid matching for fast dense correspondences," in IEEE Conference on Computer Vision and Pattern Recognition, 2013.

Brown et al., "Multi-Image Matching using Multi-Scale Oriented Patches," IEEE Computer Society Conference on Computer Vision and Pattern Recognition, 2005.

Barnes et al., "The Generalized PatchMatch Correspondence Algorithm," Computer Vision—ECCV, 2010.

\* cited by examiner

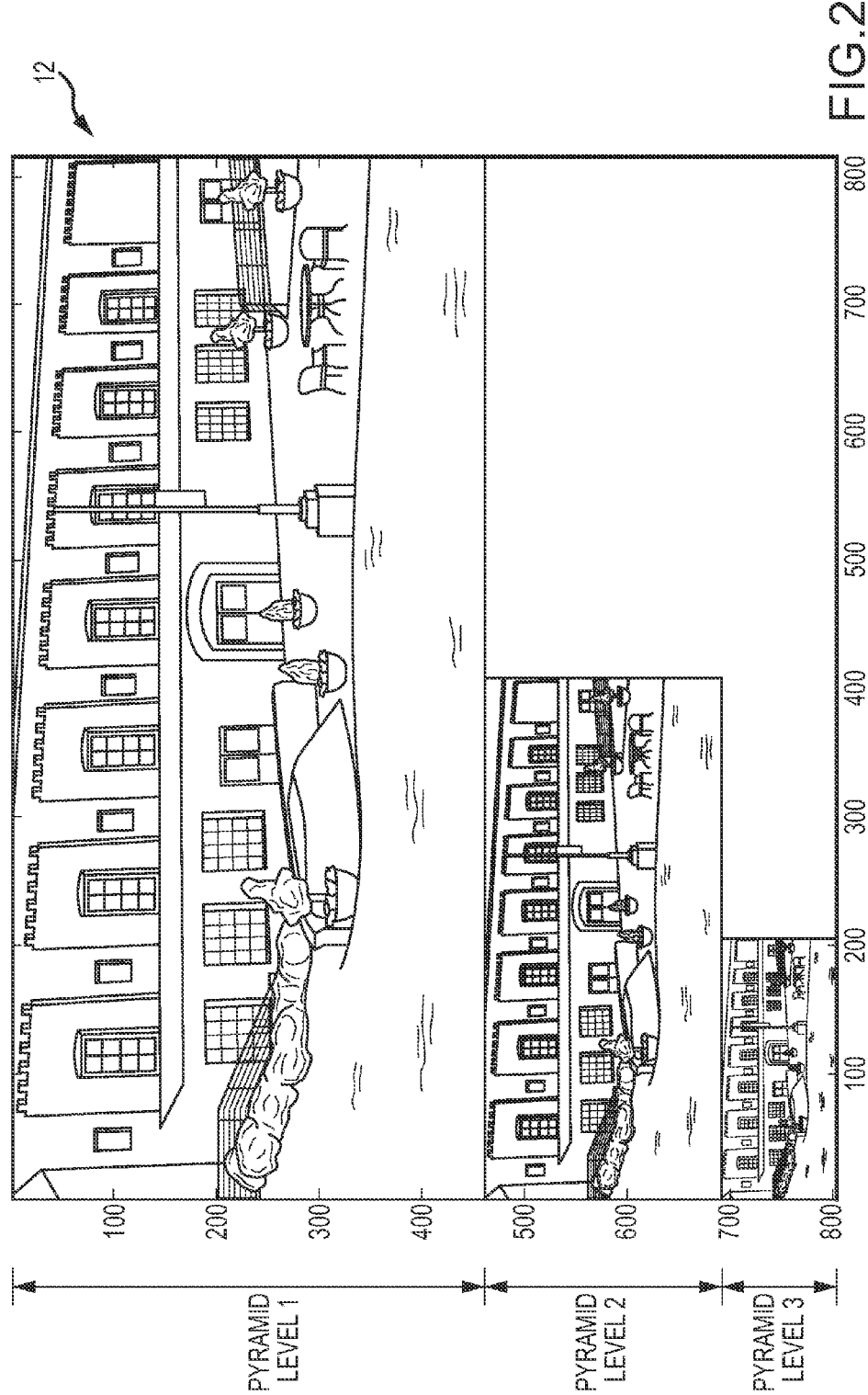

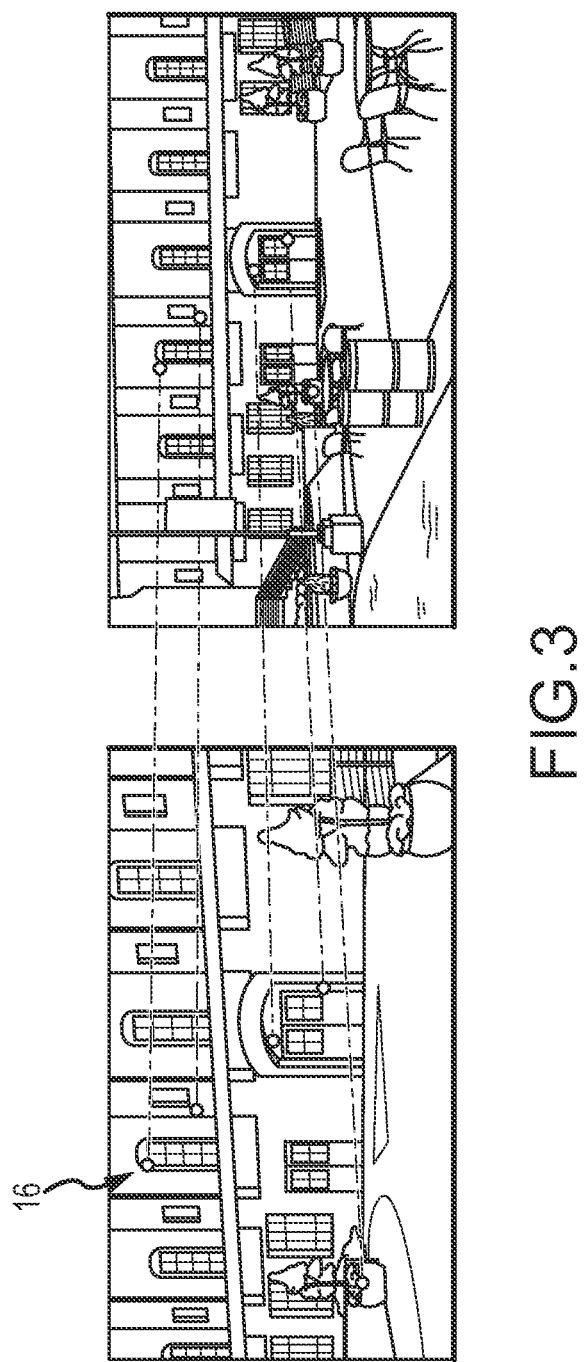

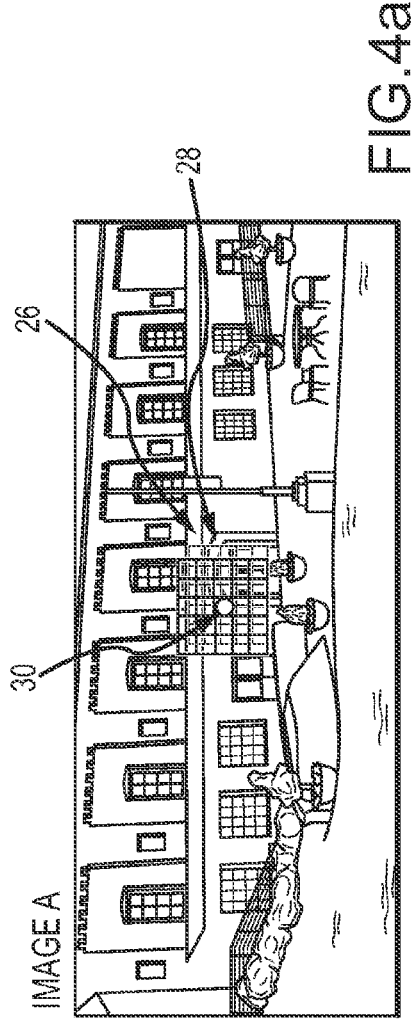
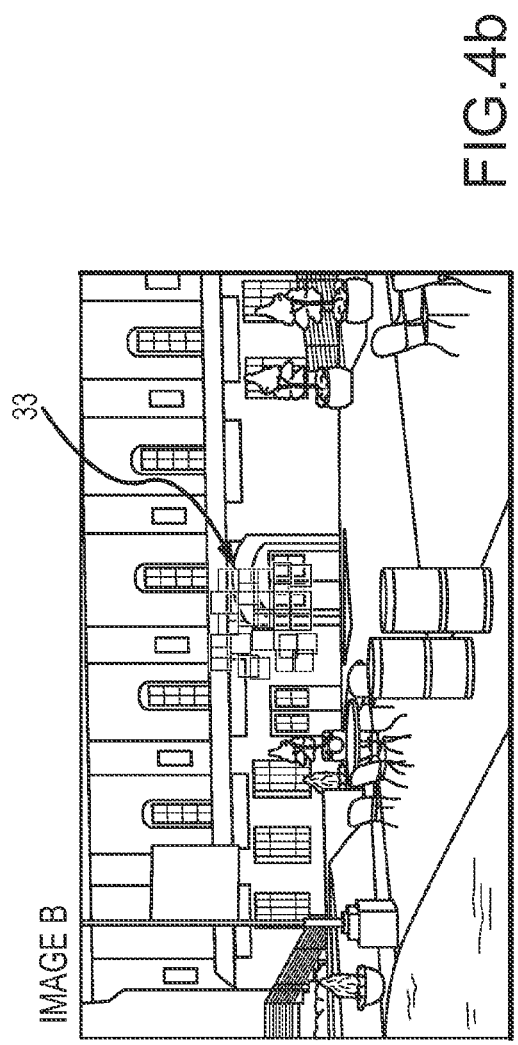

MULTI-SCALE CORRESPONDENCE POINT MATCHING USING CONSTELLATION OF IMAGE CHIPS

BACKGROUND OF THE INVENTION

Field of the Invention

This invention relates to visual point matching between a pair of images taken from different viewpoints, and more particularly to a technique of multi-scale correspondence point matching using a constellation of image chips.

Description of the Related Art

The problem of establishing correspondences between a pair of images taken from different viewpoints is central to many computer vision applications such as stereo vision, 3D reconstruction, image database retrieval, object recognition, autonomous navigation. Visual point matching for arbitrary image pairs can be very challenging because of the significant changes the scene can undergo between the two views and the complexity caused by the 3D structures: a change of viewing angle can cause a shift in perceived reflection and hue of the surface by the camera, a change of view can cause geometric distortion in the shape of objects (e.g., foreshortening due to 3D projection) in the images; a change of view can also result in object appearing at different scales or being occluded. Issues such as object motion, lighting condition change further complicate the task.

Visual point matching techniques have been investigated for decades. Earlier techniques focus on matching points taken by calibrated stereo camera pairs. More recently, there has been growing interest in techniques for matching points between images that are taken with different (possible unknown) cameras, possible at different time, and with arbitrary viewpoints. Correspondence methods in the published literature generally fall into two types: feature-based methods that attempt to extract small amount of local salient features to establish matches W. Förstner, "A feature based correspondence algorithm for image matching," *International Archives of Photogrammetry and Remote Sensing*, vol. 26, no. 3, pp. 150-166, 1986 and C. Harris, "Geometry from visual motion," in *Active Vision*, Cambridge, Mass. USA, MIT Press, 1993, pp. 263-284; direct methods that attempt to use all of the pixels to iteratively align images B. D. Lucas and T. Kanade, "An iterative image registration technique with an application to stereo vision," in *Proceedings of the 7th International Joint Conference on Artificial Intelligence*, 1981 and J. R. Bergen, P. Anandan, K. J. Hanna and H. Rajesh, "Hierarchical model-based motion estimation," in *Computer Vision—ECCV'92*, 1992. The Middlebury stereo vision benchmark and the related more than 150 publications provide an assessment of the state-of-the-art. Scharstein and R. Szeliski, "Stereo—Middlebury Computer Vision," http://vision.middlebury.edu/stereo/20 Oct. 2014.

In Brown, R. Szeliski and S. Winder, "Multi-image matching using multi-scale oriented patches," in *IEEE Computer Society Conference on Computer Vision and Pattern Recognition*, 2005, the authors proposed a correspondence technique based on matching up multi-scale Harris corner points. Harris corner points are detected over multi-resolution pyramids of input images. The authors define an 8×8 patch at each Harris corner point. Matching is done over the feature descriptor of the patches. This approach uses specific feature points (Harris corner points); it creates a feature descriptor by sampling a local 8×8 patch of pixels around the interesting point and performs the Haar wavelet transformation to form a 64-dimenstional vector. It then uses a nearest neighbor search to find the best matches.

In T. Li, G. Mona K., L. Kyungmoo, A. L. Wallace, H. K. Young and A. D. Michael, "Robust multiscale stereo matching from fundus images with radiometric differences," *IEEE Transactions on Pattern Analysis and Machine Intelligence*, pp. 2245-2258, 2011, the authors developed a feature-point based, multi-scale stereo matching technique: the approach generates scale spaces of the input image pair with variable-scale Gaussian kernels and solve the dense point correspondence problem by evaluating the continuous behavior of the feature points in the scale space. The approach uses the predicted scale space drift behavior of "SIFT"-like feature points to regularize the search for the best match. In addition, the approach in (Li, Mona K., Kyungmoo, Wallace, Young, & Michael, 2011) propagates the search from coarse-to-fine scale in the scale space.

In J. Kim, C. Liu, F. Sha and K. Grauman, "Deformable spatial pyramid matching for fast dense correspondences," in *IEEE Conference on Computer Vision and Pattern Recognition*, 2013, the authors developed a deformable spatial pyramid (DSP) graph based matching technique for the correspondence problem. The approach performs matching over multi-resolution pyramids of input images. The approach uses "cells" (group of pixels) to define the elements in each pyramid layer and defines a graph model over cells in the pyramid. In addition, the approach establishes correspondence over special feature points (Harris corner points) between the images via a graph search method.

In C. Barnes, E. Shechtman, D. B. Goldman and A. Finkelstein, "The generalized patchmatch correspondence algorithm," in *computer Vision—ECCV*, 2010, the authors developed a multi-scale searching scheme to match rectangular patches of two images for the correspondence problem. The approach compares an unscaled patch in one image with patches at a range of rotations and scales in the other image and find the best match.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a method of matching images A and B of the same scene taken at different locations in the scene by matching correspondence points in the image by evaluating pixel characteristics from nearby regions using a constellation of image chips and utilizing joint information across multiple resolution levels in a probability framework. Since each image chip is small, each chip in one image potentially can be matched with a number of chips in the other image. The accumulation of evidence (probability) over all image chips within the constellation over multiple resolution levels reduces the ambiguity. The use of a constellation of image chips removes the requirement present in most visual point matching techniques to special feature points (e.g. corner points) as the correspondence points.

In an embodiment, resolution pyramids are created for Images A and B. A plurality of correspondence points are selected in image A. These points may be selected without consideration of any specific features e.g. pixels on a grid or randomly over the image. For each correspondence point and at each of a plurality of levels in the resolution pyramid, a constellation of multiple image chips are positioned in a pre-defined spatial arrangement around the correspondence point in Image A. Each chip comprises a pre-defined spatial configuration (e.g. a rectangle) of multiple pixels and at least one of the chips includes the correspondence point. A joint likelihood map (JLM) is computed as a function of displacement of the constellation of image chips in Image B from the same or different level in the pyramid, each likelihood value in the map represents the likelihood of the correspondence point in A is located at the position specified by the displacement value in Image B. The JLM may be computed as a negative log likelihood or as a probability function or histogram LUT derived from the images themselves. An aggregate joint likelihood map is computed by integrating the likelihood maps over the plurality of levels. This integration represents an "accumulation of evidence" of a given correspondence point in image A is located in a different location as hypothesized by the displacement over the resolution pyramid. Constellation displacements are selected from the aggregate joint likelihood maps with the highest likelihood value to identify correspondence points in Image B for the correspondence points in Image A. This selection can be done on a point-by-point basis and then fit to a correspondence transformation or the selection can based on a global optimization that fits all of the points to a correspondence transformation.

In an embodiment, the JLM is limited to displacements of image chips in Image B from the same level in the pyramid as Image A. This embodiment does not allow for change of scale between Images A and B. In another embodiment, the JLM allows for displacements of image chips in Image B to be from the same or a different level in the pyramid as Image A. This embodiment allows for change of scale between Images A and B.

In an embodiment, the JLM for a chip represents the likelihood an image chip in Image A and an image chip in Image B are from the area of a scene. The JLM incorporates a sub-pixel motion model ("chip shimmy") and an illumination model to correct pixel value variation due to sub-pixel motion and illumination change and calculates the residue difference via probability of sensor noise (noise model). The noise model may be derived from the pair of images.

In an embodiment, after JLM for a chip is computed, the value of the JLM at each pixel position is modified by applying a local search for the best value within a local neighborhood. This "constellation shimmy" is used to account for spatial deformation due to 3D perspective change, or non-ridge deformation of object shape.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 2 is an illustration of a resolution pyramid of an input image;

FIG. 3 is an illustration of correspondence points in a pair of input images;

FIGS. 4a and 4b are illustration of a constellation of image points around a correspondence point in the pair of input images;

DETAILED DESCRIPTION OF THE INVENTION

The present invention provides a method of matching images A and B of the same scene taken at different locations in the scene by matching correspondence points in the image by evaluating pixel characteristics from nearby regions using a constellation of image chips and utilizing joint information across multiple resolution levels in a probability framework. Since each image chip is small, each chip in one image potentially can be matched with a number of chips in the other image. The accumulation of evidence (probability) over all image chips within the constellation over multiple resolution levels reduces the ambiguity. The use of a constellation of image chips removes the requirement present in most visual point matching techniques to use special feature points (e.g. corner points or edges) as the correspondence points. The method provides effective correspondence matching across scenes for images with wide baselines (e.g., perspective change as high as 40 degrees). The method can be used to determine displacement for a variety of visual tasks including but not limited to localization/navigation, visual odometry, target tracking or surface/3D modeling, object recognition or object classification.

Figure 1:
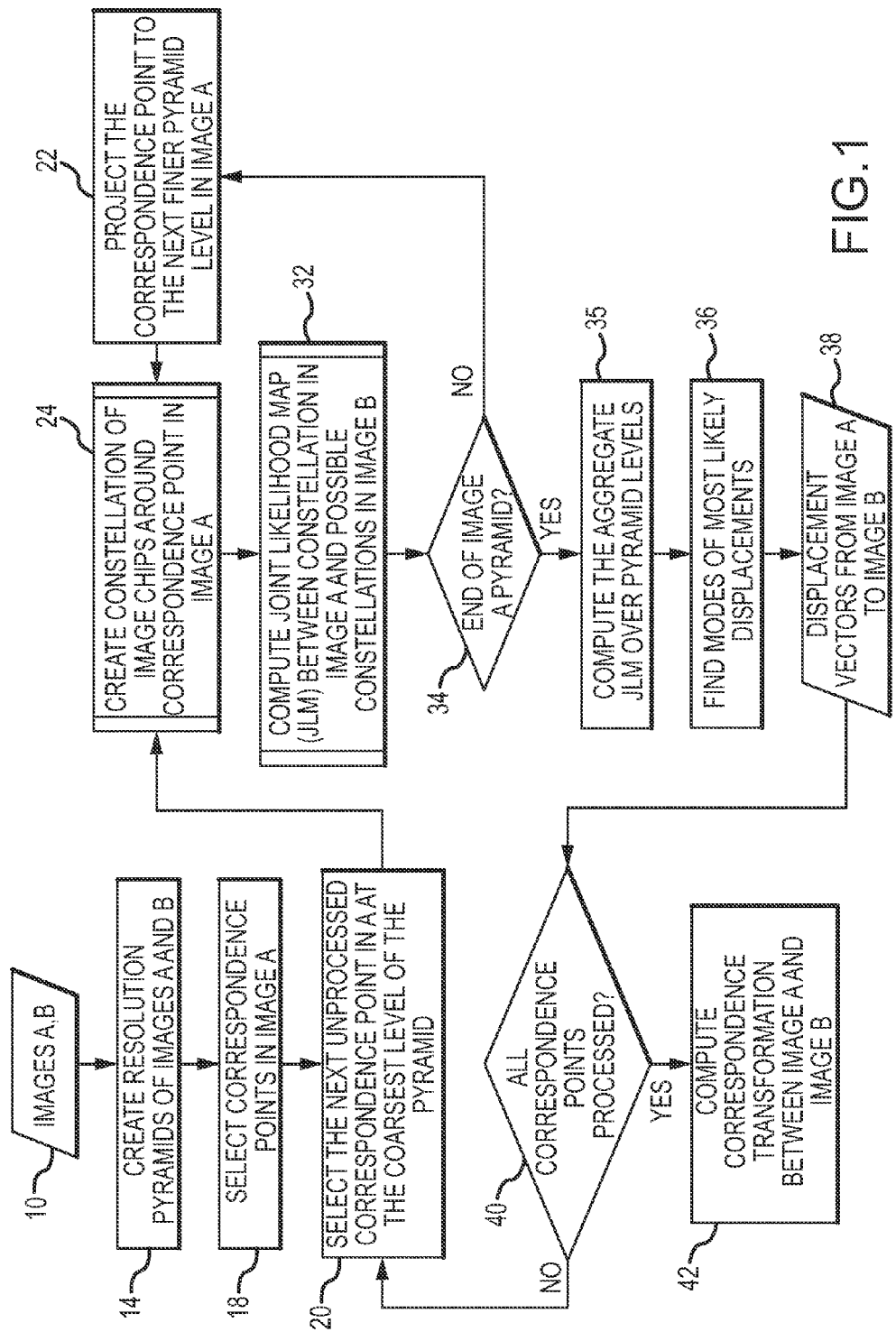
FIG. 1 is a flow diagram of an embodiment of a method of visual point matching via multi-scale correspondence point matching using a constellation of image chips

Referring now to FIG. 1, in an embodiment that does not allow for change of scale a pair of Image, Image A and Image B of the same scene taken at different locations in the scene, are provided as inputs (step 10). The images may be captured by a pair of cameras at the different locations or by a single camera moving through the scene. The perspective change between images may be as high as 40 degrees. Resolution pyramids such as pyramid 12 shown in FIG. 2 are created for Image A and Image B (step 14). The pyramid will have at least 3 levels and typically 5 or 6. The pyramids allow for the use of distinct features embedded at different resolutions to resolve ambiguities in the match: a larger physical scene area (context) is examined in the coarser resolution, while greater details are examined at finer resolution.

Correspondence points such as points 16 shown in FIG. 3 are selected in Image A (step 18). The correspondence points do not have to be feature-specific points of interest (e.g., corners, edges and so forth). The correspondence points may be feature specific points such as corner points or other types of feature points extracted by SIFT or SURF techniques. The current approach actually favors the use of correspondence points that lie within the boundary of object, points that are more stable. These types of non-feature specific points may be selected on some type of grid or randomly.

The process finds the most likely matching point in the second image (image B) for a given correspondence point in the first image (image A). The process iteratively computes the "likelihoods of displacements" of the point in the second image at multiple levels of resolution and uses the likelihood of displacements across scales to find the most likely matching position.

To implement the process, a next unprocessed correspondence point in Image A is selected at the coarsest level of the pyramid (step 20). A constellation of multiple image chips in a pre-defined arrangement (e.g. a regular grid or a square) is created around the correspondence point (step 24). The chips may or may not overlap. As shown in FIG. 4a, a constellation 26 includes multiple image chips 28 in a pre-defined arrangement (e.g., a 5×5 square) around correspondence point 30. Each image chip 28 comprising a pre-defined spatial configuration (e.g. a rectangle, triangle, etc.) of multiple pixels. Each chip covers a small area of the scene (e.g., 11×11 pixels). Because the chip area is small the illumination variation due to view point change can be modeled generally such that it does not depend on specific object features. A least one chip 28 in the constellation 26 includes the correspondence point 30.

A joint likelihood map (JLM) is computed between the constellation in image A and possible constellations in Image B as a function of displacement of the constellation of image chips in Image B (step 32) in which each chip in image B is allowed a small independent perturbation. An example of displacement of image chips 33 in Image B is shown in FIG. 4b. The JLM for a constellation computes the likelihood by integrating the likelihood values computed over individual chips within the constellation. One method of integration is to sum the likelihood values at each displacement location over all the chips.

In an embodiment, the likelihood of displacement for a correspondence point in image A at position (dx, dy) in image B is calculated as the joint probability of chips in the constellation, marginalized over possible occlusions. When negative log probability is used for the displacement likelihood calculation one possible implementation of this joint probability is as sum of the negative log probability according to equation (1).

$$L_P(dx, dy) = \sum_c \begin{cases} L_c(dx, dy) - \min L_c & L_c(dx, dy) - \min L_c \le N_t \\ N_t & L_c(dx, dy) - \min L_c > N_t \end{cases} \quad (1)$$

$$\min L_c = \min_{x,y} L_c(dx, dy)$$

Note that the likelihood calculation puts an upper threshold $N_t$ on the likelihood value for each chip in the constellation. This formulation effectively models the pixel difference using the Laplacian when the likelihood $L_c(dx, dy)$ is lower than the threshold $N_t$; when the likelihood is larger than the threshold, it is considered an outlier (e.g., no match). This is a real concern (e.g. during occlusion or specular reflection). When computing, the JLM of an individual chip, a distinct void hypothesis is considered against the likelihood of a match. Furthermore, a uniform distribution is assumed in this case and a constant likelihood value is assigned mainly because we usually lack statistics to model the distribution of these outliers in practice. This implementation is to account for occlusion: the constellation in image B might be the same areas of objects for the one in image A, but there might be chips in the constellation that belong to other objects not seen in image A. In this scenario, the algorithm needs to limit undue influence of the "out-of-view" chip to enable correct assessment of the probability.

This process is repeated at multiple levels by projecting the correspondence point to the next finer (higher resolution) level of the pyramid (step 22), suitably all levels, in the pyramid. Once the end of Image A pyramid is reached (step 34), an aggregate JLM for the correspondence point is computed (step 35) by integrating the JLMs over the plurality of pyramid levels. The term "integration" refers broadly to the accumulation of evidence over the multiple resolution levels. For example, one method of integration is to compute the sum of the likelihood values over all computed resolution levels.

The modes of the most likely displacements are found from the aggregate JLM (step 36) and output as displacement vectors from Image A to Image B (step 38). The modes of the most likely displacements correspond to local peaks in the aggregate JLM. In this embodiment, the modes are identified for each correspondence point individually. Once all of the correspondence points have been processed (step 40), a correspondence transformation between Image A and Image B is computed (step 42). The transformation (e.g. affine or bi-linear) is fit to the displacement vectors.

Alternatively, the aggregate JLMs may be computed for all of the correspondence points and then the modes are found via a global optimization to the desired correspondence transformation. One way is applying a least square fitting (LSQ) between the transformation function and the local displacement points. Another way is to use the RANSAC method, which randomly selects a subset of the local displacement points, fitting the global transformation (again, using LSQ), we then use the fitted global transformation to compute a goodness-of-fit value between image A and B. This process then is repeated a large number of times, the best "goodness-of-fit" transformation becomes the final transformation.

Figure 5:
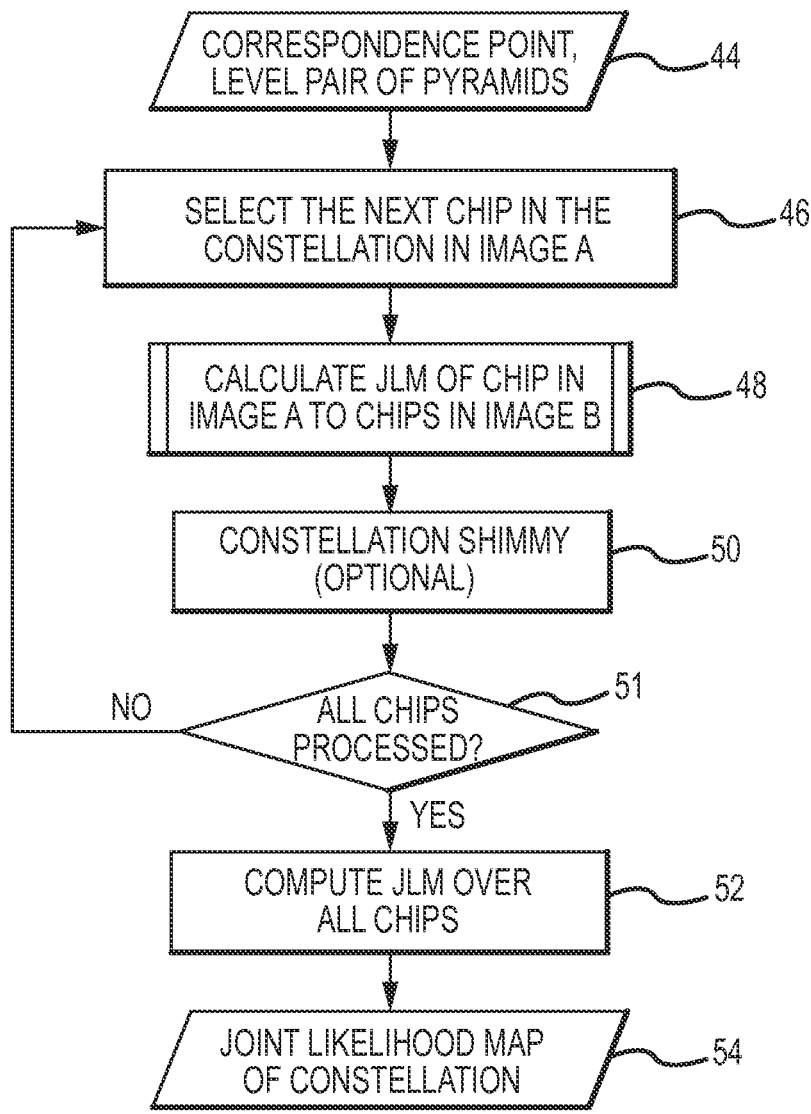
FIG. 5 is a flow diagram of an embodiment of a method for computing a joint likelihood map (JLM) of a constellation.

Referring now to FIG. 5, the likelihood of displacement between a point in image A and a point in image B at a pair of resolution layers is calculated over the constellation of chips centered on the point. An embodiment for computing the JLM of a constellation for a correspondence point at a given level (step 32 in FIG. 1) comprises receiving the correspondence point, constellation and pyramid level (step 44). The next chip in the constellation in Image A is selected (step 46) and the JLM of the chip in Image A to chips in Image B is calculated (step 48). The JLM for a chip computes the likelihood that a patch of image pixels (chip) in Image A and a patch of image pixels (chip) in Image B are from the same area of a the scene. In an embodiment, the JLM incorporates a sub-pixel motion model and an illumination model to correct pixel value variation due to sub-pixel motion and illumination change and calculates the residue difference via a probability of sensor noise (noise model). The noise model may be derived empirically from Images A and B. The process first assesses the likelihood of displacement of each chip in the constellation over all possible locations in image B.

Figure 6:
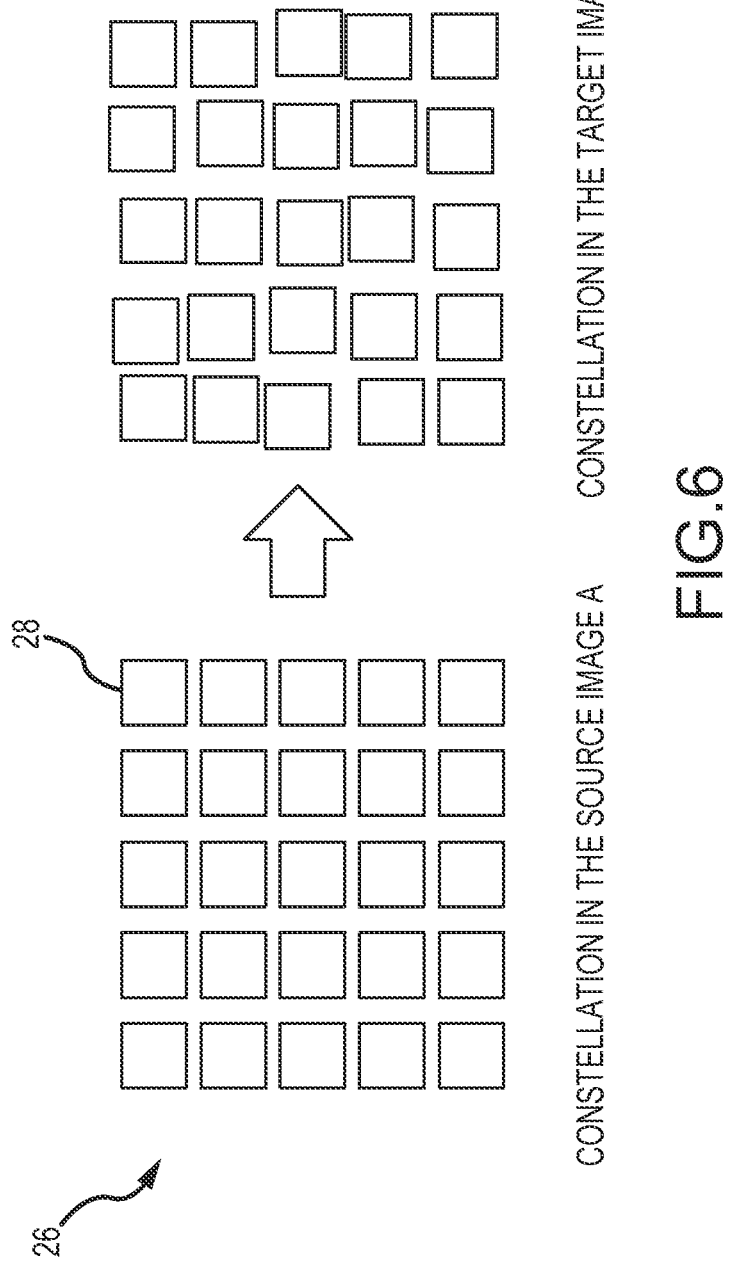
FIG. 6 is an illustration of constellation shimmy.

The process optionally allows individual chips in the constellation a small amount of deformation in position (non-rigid displacement of chips in the constellation) in a process called "constellation shimmy" (step 50). As shown in FIG. 6, the regularly positioned chips 28 in constellation 26 in source image A are allowed to a small independent perturbation from a mean displacement referred to as "shimmy" in target Image B.

Constellation shimmy is implemented by searching for the minimum within a local neighborhood in the likelihood map before summing them up. In the case, the value $L_c$ in Equation (1) is replaced with a local minimum. Equations (1) and (2) describe the actual formula used.

$$\tilde{L}_c(dx, dy) = \min_{s_x, s_y} L_c(dx + s_x, dy + s_y) \quad (2)$$

$$L_P(dx, dy) = \sum_i \begin{cases} \tilde{L}_c(dx, dy) - \min L_c & \tilde{L}_c(dx, dy) - \min L_c \leq N_t \\ N_t & \tilde{L}_c(dx, dy) - \min L_c > N_t \end{cases} \quad (3)$$

$$\min \tilde{L}_c = \min_{x,y} \tilde{L}_c(dx, dy)$$

The default range of $S_x$, $S_y$ is [−2, 2]. The "constellation shimmy" operation is designed to account for geometric change of the scene in the constellation from image A to image B due to perspective changes and object deformation. This process is repeated for each chip (step 51).

The joint probability of displacements overall all chips in the constellation is computed according to Equation (1) (step 52) and output as the JLM of the constellation (step 54). Assuming independent noise, the joint probability can be computed by summing up the likelihood values of all chips in the constellation. Other computation of joint probability can be implemented for correlated noise if the correlation is known. The result is the JLM of a constellation of displacement for the input correspondence point.

Figure 7:
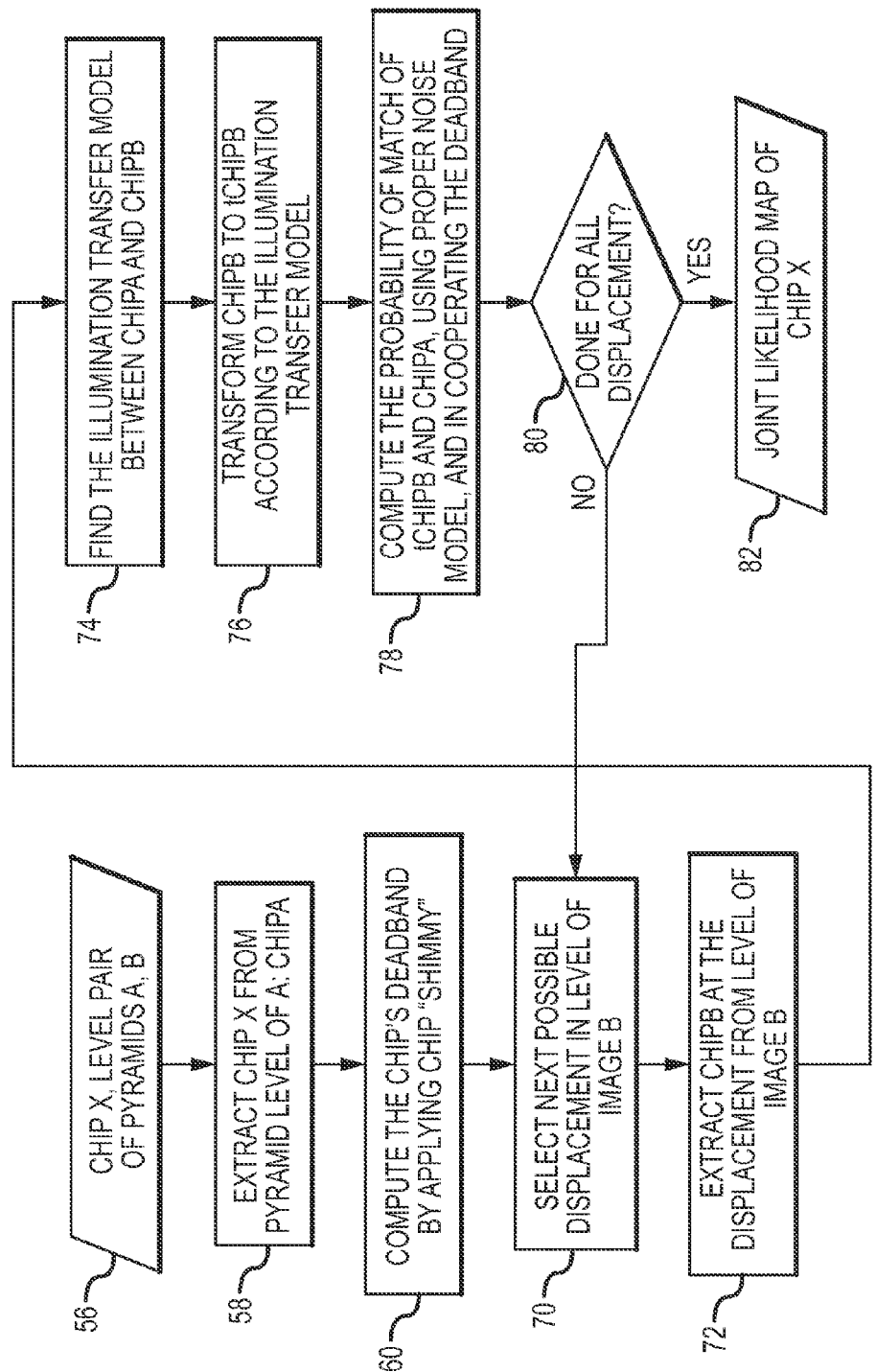
FIG. 7 is a flow diagram of an embodiment of a method for computing a joint likelihood map (JLM) of an image chip.

Referring now to FIG. 7, an embodiment for computing the JLM of a chip x (step 48 in FIG. 5) comprises receiving the chip x and pyramid level (step 56), extracting chip x from the pyramid level of Image A (step 58) and computing the chip's deadband (step 60).

Figure 8:
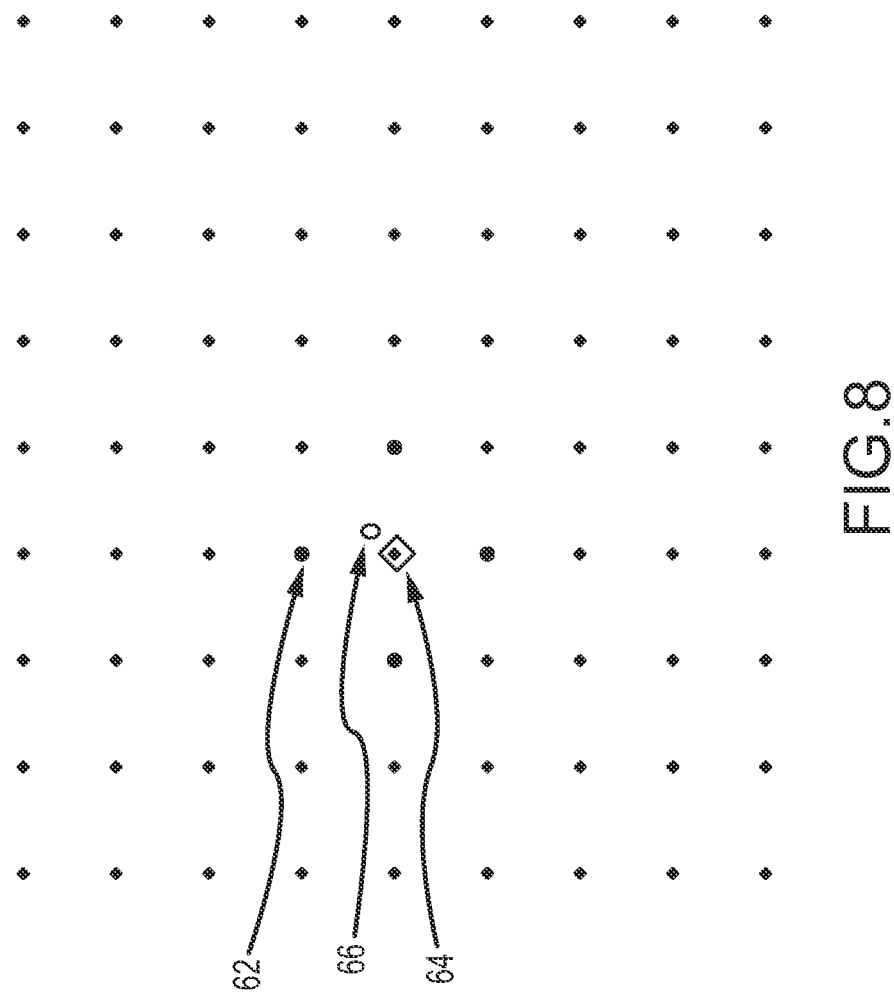
FIG. 8 is an illustration of chip shimmy.

A subpixel matching technique may be incorporated to allow for sub-pixel motion. In an embodiment, to allow for sub-pixel motion, for each pixel, the lower/upper bounds of the pixel intensity in its K×K neighborhood (K=3 in the current implementation) are calculated and used as the range of 'no difference' when comparing the pixel with that in image B. The range of 'no difference' is referred to as 'dead-band' 62 in FIG. 8. Position 64 is the location in Image B where the correspondence point in Image A is compared to; position 66 is the actual location at sub-pixel level, not observed, where the correspondence in Image A is located in Image B; and the pixels circled in red are supporting pixels used to compute the dead band. The process of looking for the dead-band in a pixel's neighborhood is referred to as 'chip shimmy' Equations (4) shows an embodiment of the formula of this step, in which $T_a$ is the intensity of the chip from image A.

$$T_a^{min}(x, y) = \min_{\{(x+1,y),(x-1,y),(x,y+1),(x,y-1)\}} T_a(x + n_x, y + n_y) \quad (4)$$

$$T_a^{max}(x, y) = \max_{\{(x+1,y),(x-1,y),(x,y+1),(x,y-1)\}} T_a(x + n_x, y + n_y)$$

The next possible displacement in the current pyramid level of Image B is selected (step 70) and ChipB is extracted from Image B (step 72).

An illumination transfer model is determined between ChipA and Chip B (step 74) and chipB is transformed to tchipB according to that model (step 76). To account for the change of pixel intensity due to illumination variation or the change of camera view position. An implementation assumes an affine transform model for illumination change.

$$S_b^{dx,dy}(x,y) = f_a * T_b^{dx,dy}(x,y) + f_b \quad (5)$$

Where $f_a$, $f_b$ are (unknown) coefficients; $S_b^{dx,dy}$ is the pixel intensity in image B at displacement (dx, dy) with respect to position (x, y). The algorithm uses a least square fitting to estimate $f_a$, $f_b$ as shown in Equation (6) below:

$$\min_{(f_a, f_b)} \left( \Sigma_{x,y} \left( T_a(x, y) - \left( f_a * T_b^{dx,dy}(x, y) + f_b \right) \right)^2 \right), \quad (6)$$

$$f_a = 4 \text{ if } f_a > 4,$$

The least square fitting applies the threshold $f_a$ to reject very large illumination changes.

This model assumes that the change of pixel intensity within the matching window of a chip between the two views of a scene can be modeled as an affine transformation. Residue differences between the two after the affine transformation are due to sensor noise, which is modeled as independent noise. This assumption is approximately valid in most cases when the size of the chip is sufficiently small. However, if the assumption is not valid or if larger chip size is desired, other illumination models can be introduced in place of the affine model.

Finally, the probability that a chip in image A is displaced by (dx,dy) in image B is calculated (step 78) according Equations (7).

$$L_c(dx, dy) = \sum_{x,y} Pr(T_a(x, y), S_b^{dx,dy}(x, y)) \quad (7)$$

In one possible implementation, the probability is computed as the distance between the pixel values (equivalent to negative log probability under exponential distribution) according to equations (8) and (9).

$$D(T_a(x, y), S_b^{dx,dy}(x, y)) = \begin{cases} 0 & d_{min} \geq 0 \text{ and } d_{max} \leq 0 \\ \min(|d_{min}|, |d_{max}|) & d_{min} < 0 \text{ or } d_{max} > 0 \end{cases} \quad (8)$$

$$d_{min} = S_b^{dx,dy}(x, y) - T_a^{min}(x, y) \quad (9)$$
$$d_{max} = S_b^{dx,dy}(x, y) - T_a^{max}(x, y)$$

In equation (8) the distance function D() is set to zero if the pixel value of the transformed chip from image B is between the upper and lower bounds of the corresponding pixel in the chip from image A; otherwise, it is set to the minimal of the absolute differences with the lower and upper bounds. Other distance metrics can be applied.

The distance function D( ) used in equation (8) is determined by the noise model of the sensor. Currently the method assumes that the sensor noise is independent of pixel position and has a Laplacian-like distribution (this is typically the case for many imaging sensors). This assumption justifies the use of absolute intensity difference as the measure of likelihood of displacement. Other noise models can be used in place of the Laplacian model. For example, the sensor noise model could be Gaussian. In this case, square distance of intensity should be used as the likelihood calculation.

If the sensor noise model is not known a prior, am empirical noise model can be learned from the data, for example, as histogram of local pixel intensity differences. In this case, the likelihood calculation shall be computed using a look-up table as the negative log probability of the intensity difference between the pixels in the image A and illumination transformed image B.

Steps 70, 72, 74 and 78 are repeated for all displacements (step 80) and the joint likelihood map of chip x $L_c(dx,dy)$ is produced (step 82).

Figure 9:
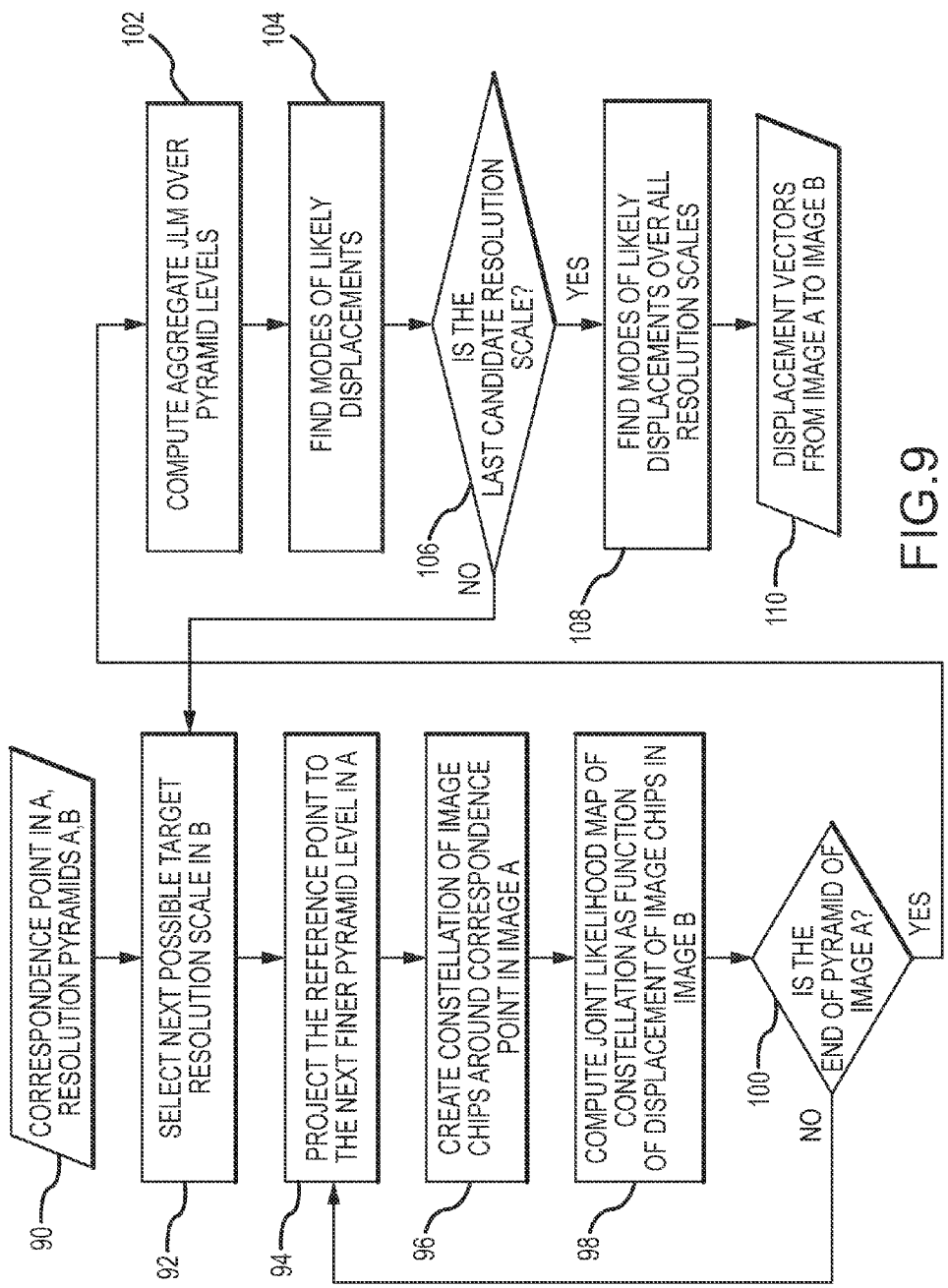
FIG. 9 is another embodiment of a method for computing displacement vectors in which the image chips are allowed to reside at different levels of the resolution pyramid.

In the described embodiment, the method searches for chip correspondences between the same resolutions levels of the input images. This assumes that the scene in image A and B are taken at the same scale. The algorithm can be modified so that the search does not have to be restricted to the same resolution level. One possible choice is to allow the search to be conducted over a local neighborhood of resolution in the target pyramid (image B) to allow scale changes between image A and image B. FIG. 9 shows a possible implementation of this search scheme.

Given a correspondence point in Image A and resolution pyramids for Images A and B (step 90), the method selects the next possible target resolution scale in image B (step 92) and projects the correspondence point to the next finer pyramid level in Image A (step 94). A constellation of multiple image chips in a pre-defined arrangement (e.g. a square) is created around the correspondence point (step 96). A joint likelihood map (JLM) is computed as a function of displacement of the constellation of image chips in Image B (step 98). Steps 94, 96 and 98 are repeated until the end of the Image A pyramid is reacted (step 100). The aggregate JLM over all pyramid levels is computed (step 102) and modes of likely displacements are identified (step 104). The method returns to step 92 to select the next possible target resolution scale in Image B and repeats the process until the last candidate resolution scale has been computed (step 106). The method determines the modes of likely displacements over all resolution scales (step 108) and returns the displacement vectors (step 110).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of matching Images A and B of the same scene taken at different locations in the scene, comprising:
    creating resolution pyramids for source images including Image A and Image B, each said resolution pyramid including a plurality of different resolution levels of the entire source image;
    selecting a plurality of correspondence points in Image A;
    projecting each correspondence point from a resolution level to a next higher resolution level for all levels in the resolution pyramid while maintaining the position of the correspondence point at each resolution level;
    for each correspondence point,
        at each of a plurality of levels in the resolution pyramid for Image A,
            creating a constellation of multiple image chips in a pre-defined spatial arrangement around the correspondence point at the resolution level in the resolution pyramid for Image A, each chip comprising a pre-defined spatial configuration of multiple pixels, at least one said chip including the correspondence point, said constellation of multiple image chips maintaining the same pre-defined spatial arrangement around the correspondence point at all resolution levels of the resolution pyramid for Image A; and
            computing a joint likelihood map (JLM) between the constellation in image A and possible constellations of multiple image chips in the resolution pyramid for Image B as a function of a displacement from the correspondence point in Image A to each of the possible constellations of image chips in Image B from the same or different resolution level of the resolution pyramid for Image A, each likelihood value in the map representing the likelihood that the correspondence point in Image A is located at the position specified by the displacement in Image B;
    computing an aggregate joint likelihood map by integrating the joint likelihood maps over the plurality of resolution levels; and
    selecting the constellation displacements from the aggregate joint likelihood maps with the highest likelihood value to identify correspondence points in Image B for the correspondence points in Image A.

2. The method of claim 1, wherein the correspondence points are selected without regard to specific feature traits.

3. The method of claim 2, wherein selecting the correspondence points comprises selecting correspondence points on a grid or randomly.

4. The method of claim 1, wherein computing the JLM comprises computing a JLM for each chip in the constellation for Image A and then computing the joint probability of displacements over all chips in the constellation for Image A.

5. The method of claim 4, further comprising allowing individual chips in the constellation for Image B to vary position by +/−N pixels and allowing each pixel in each of the individual chips to vary position by up to ½ pixel in each direction and then computing the joint probability of displacements over all chips in the constellation.

6. The method of claim 1, wherein computing the aggregate JLM for a correspondence point comprises computing the aggregate JLM at each of a plurality of resolution levels in the resolution pyramid for Image B and then selecting the constellation displacements over all of said plurality of resolution levels for Image B.

7. The method of claim 1, wherein computing an aggregate JLM over the plurality of resolution levels for Image A comprises finding the highest likelihood values over JLM maps from a plurality of resolution levels for Image B at each displacement location.

8. The method of claim 1, wherein the selected constellation displacements are selected for each correspondence point independently.

9. The method of claim 1, wherein the selected constellation displacements are selected for all correspondence points globally.

10. The method of claim 1, further comprising using the selected constellation displacements to compute a correspondence transform from Image A to Image B.

11. A method of matching Images A and B of the same scene taken at different locations in the scene, comprising:
    creating resolution pyramids for Image A and Image B;
    selecting a plurality of correspondence points in Image A;
    for each correspondence point,
        at each of a plurality of levels in the resolution pyramid for Image A,
            creating a constellation of multiple image chips in a pre-defined spatial arrangement around the correspondence point at the level in the resolution pyramid for Image A, each chip comprising a pre-defined spatial configuration of multiple pixels, at least one said chip including the correspondence point; and computing a joint likelihood map (JLM) between the constellation in image A and possible constellations of multiple image chips in the resolution pyramid for Image B as a function of a displacement from the correspondence point in Image A to each of the possible constellations of image chips in Image B from the same or different level of the resolution pyramid for Image A, each likelihood value in the map representing the likelihood that the correspondence point in Image A is located at the position specified by the displacement in Image B, wherein computing the JLM comprises computing a JLM for each chip in the constellation for Image A and then computing the joint probability of displacements over all chips in the constellation for Image A, wherein the joint probability of displacements over all chips in the constellation is computed according to:

$$L_P(dx, dy) = \sum_c \begin{matrix} L_c(dx, dy) - \min L_c & L_c(dx, dy) - \min L_c \leq N_t \\ N_t & L_c(dx, dy) - \min L_c > N_t \end{matrix}$$

$$\min L_c = \min_{x,y} L_c(dx, dy)$$

where $N_2$ is an upper threshold on the likelihood value for each chip in the constellation, (dx,dy) is the displacement with respect to position (x,y) in Image B and $L_c$(dx,dy) is the JLM for a chip;

computing an aggregate joint likelihood map by integrating the joint likelihood maps over the plurality of levels; and selecting the constellation displacements from the aggregate joint likelihood maps with the highest likelihood value to identify correspondence points in Image B for the correspondence points in Image A.

12. A method of matching Images A and B of the same scene taken at different locations in the scene, comprising:
creating resolution pyramids for Image A and Image B;
selecting a plurality of correspondence points in Image A;
for each correspondence point,
at each of a plurality of levels in the resolution pyramid for Image A,
creating a constellation of multiple image chips in a pre-defined spatial arrangement around the correspondence point at the level in the resolution pyramid for Image A, each chip comprising a pre-defined spatial configuration of multiple pixels, at least one said chip including the correspondence point; and
computing a joint likelihood map (JLM) between the constellation in image A and possible constellations of multiple image chips in the resolution pyramid for Image B as a function of a displacement from the correspondence point in Image A to each of the possible constellations of image chips in Image B from the same or different level of the resolution pyramid for Image A, each likelihood value in the map representing the likelihood that the correspondence point in Image A is located at the position specified by the displacement in Image B, wherein computing the JLM comprises computing a JLM for each chip in the constellation for Image A and then computing the joint probability of displacements over all chips in the constellation for Image A, wherein the JLM for each chip in the constellation for Image A incorporates empiric illumination and noise models derived from Images A and B;
computing an aggregate joint likelihood map by integrating the joint likelihood maps over the plurality of levels; and
selecting the constellation displacements from the aggregate joint likelihood maps with the highest likelihood value to identify correspondence points in Image B for the correspondence points in Image A.

13. A method of matching Images A and B of the same scene taken at different locations in the scene, comprising:
creating a resolution pyramids for Image A and Image B;
selecting a plurality of correspondence points in Image A without regard to specific features;
for each correspondence point,
at each of a plurality of levels in the resolution pyramid for Image A,
creating a constellation of multiple image chips in a pre-defined spatial arrangement around the correspondence point at the level in the resolution pyramid for Image A, each chip comprising a pre-defined spatial configuration of multiple pixels, at least one said chip including the correspondence point; and
computing a joint likelihood map (JLM) between the constellation in image A and possible constellations of multiple image chips in the resolution pyramid for Image B as a function of the displacement from the correspondence point in Image A to each of the possible constellations of image chips in Image B from the same or different level of the resolution pyramid for Image A in which the JLM incorporates empiric illumination and noise models derived from Images A and B;
computing an aggregate joint likelihood map by integrating the joint likelihood maps over the plurality of levels; and
selecting the constellation displacements from the aggregate joint likelihood maps with the highest likelihood value to identify correspondence points in Image B for the correspondence points in Image A.

14. A method of matching Images A and B of the same scene taken at different locations in the scene, comprising:
creating a resolution pyramids for Image A and Image B;
selecting a plurality of correspondence points in Image A;
for each correspondence point,
at each of a plurality of levels in the resolution pyramid for Image A,
creating a constellation of multiple image chips in a pre-defined spatial arrangement around the correspondence point at the level in the resolution pyramid for Image A, each chip comprising a pre-defined spatial configuration of multiple pixels, at least one said chip including the correspondence point, said constellation of multiple image chips maintaining the same pre-defined spatial arrangement around the correspondence point at all resolution levels of the resolution pyramid for Image A; and
computing a joint likelihood map (JLM) between the constellation in image A and possible constellations of multiple image chips in the resolution pyramid for Image B as a function of the displacement from the correspondence point in Image A to each of the possible constellations of image chips in Image B from the same or different level of the resolution pyramid for Image A in which each chip in the constellation for Image B is allowed to vary position by +/−N pixels and each pixel in each said chip is allowed to vary position by up to ½ pixel in each direction;

computing an aggregate joint likelihood map by integrating the joint likelihood maps over the plurality of levels; and selecting the constellation displacements from the aggregate joint likelihood maps with the highest likelihood value to identify correspondence points in Image B for the correspondence points in Image A.

* * * * *